Fig.1

Patented Feb. 13, 1951

2,541,409

UNITED STATES PATENT OFFICE 2,541,409

GAS FRACTIONATING APPARATUS AND METHOD

Richard T. Cornelius, Minneapolis, Minn.

Application June 7, 1943, Serial No. 489,886

14 Claims. (Cl. 62—123)

1

My invention relates to gas fractionating apparatus and has for an object to provide gas fractionating apparatus particularly adaptable for use in the separation of air into its constituents.

An object of the invention resides in providing an apparatus particularly adapted to separate an exceedingly high percentage of the oxygen from the atmosphere.

Another object of the invention resides in providing an apparatus which will be entirely automatic in its operation, thus adapting the apparatus to various uses where skilled labor is not available and where constant attention is not possible.

A still further object of the invention resides in providing a process for the separation of oxygen from the air by liquefaction in which a relatively high thermodynamic efficiency is procured and in which the power consumption is a minimum.

Another object of the invention resides in providing an apparatus which is capable of operating continuously without interference from condensation of the water vapor and carbon dioxide contained in the air being fractionated.

An object of the invention resides in providing an apparatus free from danger of explosion due to combustion of the vapors of lubricants at high pressures.

Another object of the invention resides in providing an apparatus which will effectively operate at various atmospheric pressures, such as would be encountered by aircraft in changing altitude.

A further object of the invention resides in providing an apparatus which will operate at a relatively low pressure, for example, four or five atmospheres.

An object of the invention resides in providing fractionating apparatus which will be light in weight, compact and portable.

A feature of the invention resides in the use of an automatic control to regulate the operation of the air expander and thereby keep the system thermodynamically balanced.

Another object of the invention resides in providing a rectification apparatus and process in which the first stage of rectification is carried out coincident with the preliminary condensation of the air in a manner wherein the products of the first stage of rectification are readily separated and controlled.

Another object of the invention resides in producing fractionation by liquefying the air and its constituents and in accurately dividing the liquids in accordance with their requirements for use in the apparatus.

2

A feature of the invention resides in providing metering tubes in the liquid reservoirs adapted to divide the liquids into separate portions or streams of substantially fixed volumetric ratio.

Another object of the invention resides in providing an apparatus in which the impurities of the air are removed without chemical process.

An object of the invention resides in providing an apparatus in which impurities of the air such as condensed water and carbon dioxide are evaporated by exhaust gases passing through the conduits in which the impurities are deposited.

Another object of the invention resides in providing a counterflow heat exchanger having three conduits, in which the supply of compressed air to be fractionated is run through one of the conduits in one direction, the separated oxygen in another of said conduits in the opposite direction, and the remaining exhaust gases is run through the third conduit in the same direction as the oxygen, and in which the conduits in which the air and exhaust gas are run is alternated by valves which operate to produce a continuous timed cycle of operation.

A still further object of the invention resides in providing a system in which no lubricant is needed.

A feature of the invention resides in utilizing a diaphragm compressor or compressors and a diaphragm air expander in the system.

Other objects of the invention reside in the novel combination and arrangement of parts and in the details of construction hereinafter illustrated and/or described.

Inasmuch as the drawings are diagrammatic, no attempt has been made to show the details of construction of the parts or thermal insulation which is, of course, applied between all component parts which operate at considerable differences of temperature.

Figure 1:
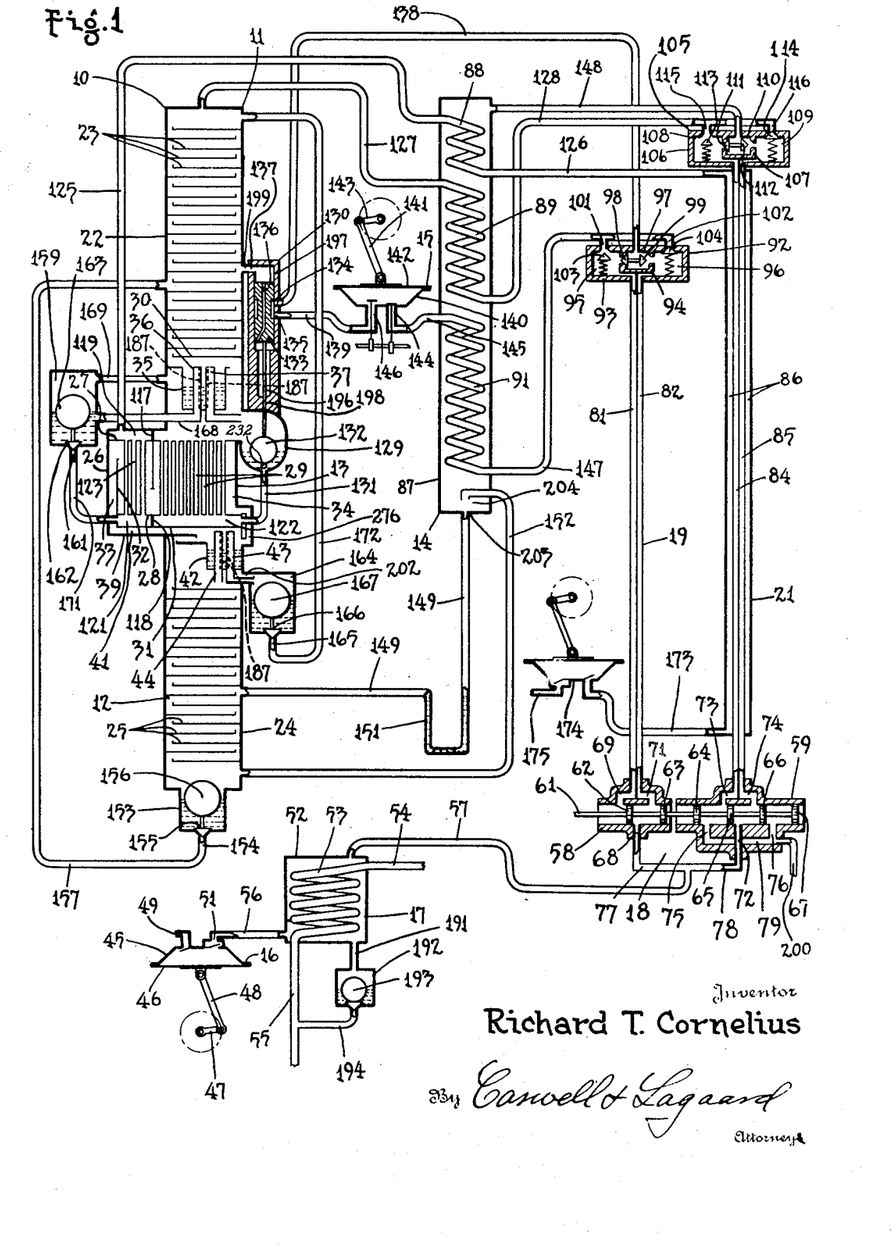
Fig. 1 is a diagrammatic view of an air fractionating apparatus illustrating an embodiment of my invention.

In my improved air fractionating apparatus, air is compressed by a compressor 16 and passes through a cooler 17 and into a valve mechanism 18, from which it is directed to two primary counterflow heat exchangers 19 and 21. The cooled air from exchanger 19 is directed through a control valve 130 to an expansion engine 15 from which it passes through a heat exchanger 14. Cooled air from exchanger 21 is directed to exchanger 14 where part of it is condensed, the condensate thus formed and the remaining air being conducted to a rectifying column 10. This column consists of an upper rectifier 11 and a lower rectifier 12. Between these rectifiers is disposed an evaporator condenser 13. In this column, the gases in the air are separated from one another and directed through the heat exchangers 14, 10 and 21, where these gases cool the incoming air.

The rectifier 11 consists of a case 22 which is provided with a number of staggered baffles 23 connected to the walls of the case and disposed throughout the major portion thereof and spaced from said walls at opposite localities to provide a tortuous passageway therethrough. These baffles form trays arranged to hold a shallow body of liquid with a large amount of exposed surface. Liquid supplied to an upper tray will cascade from one tray to another and gas forced through the column will pass over the surface of the liquid of successive trays in intimate contact therewith.

Within the lowermost portion of the case 22 of rectifier 11 is arranged a reservoir 35 which is disposed beneath the lowermost baffle 30 of said rectifier and receives the liquid discharged therefrom. This reservoir does not occupy the entire space of the case 22, so that the interior of the said case is still in communication with the interior of the tubes 29 of the evaporator condenser 13. The reservoir 35 is provided with two metering tubes 36 and 37. These tubes cause a uniform division of the liquid in the reservoir and produce two streams of liquid of substantially fixed volumetric ratio.

The rectifier 12 is constructed similar to the rectifier 11, being provided with a case 24 and similarly arranged baffles 25 therein.

The evaporator condenser 13 consists of a case 26 having two partitions 27 and 28 therein to which are attached the ends of a number of vertically arranged tubes 29 and 123. The case 26 is connected to the case 22 of rectifier 11 and also to the case 24 of rectifier 12. It will be noted that the tubes 29 communicate at their upper ends with the interior of rectifier 11 and are separated at their lower ends by means of a wall 31 from the interior of the rectifier 12. The evaporator condenser 13 is constructed so that a passageway is formed surrounding the tubes 29 which is independent from the passageways through said tubes and which communicates with passageways 33 and 34 at the ends of the evaporator condenser.

The upper ends of tubes 123 open into chamber 119 which is separated from the rectifying column 11 by partition 117. The lower ends of tubes 123 open into a chamber 121 which is separated by means of a partition 118 from chamber 122 immediately below tubes 29, said chamber being separated from rectifying column 12 by partition 31. The lowermost portion of the case 26 of the evaporator condenser 13 has a jacket 39 which provides a passageway 41 communicating with the passageway 33. Passageway 41 is in communication with the interior of the rectifier 12.

A partition 32 is placed between the tubes 123 and the case 26 and is connected to partition 28 so that condensate collecting around the tubes 123 and 29 will flow in the direction of passageway 34. The lower end of passageway 34 communicates with a passageway 276 which, in turn, communicates with a reservoir 42 located just above the trays 25 in column 12. In the reservoir 42 are arranged two metering tubes 43 and 44 which are similar to the tubes 36 and 37 and which divide the liquid collected in reservoir 42 into two streams having fixed volumetric ratio.

All of the metering tubes 36, 37, 43 and 44 are similar in construction and only tube 36, which is shown in detail in Fig. 2, will be described.

The tube 36 is received within a housing 176 which consists of two side walls 177 and 178, a rear wall 179 and two flanges 181 issuing from the ends of the side walls and spaced from one another to leave a longitudinal vertical opening 182 therebetween. The flanges 181 have converging inner surfaces 183 which extend up to the opening 182. The tube 36 consists of a thick rigid rear wall 184 with two thin flexible side walls 185 connected thereto. Two flanges 186 issue angularly therefrom and are spaced from one another at their extreme ends to form a narrow vertical slot 187. The flanges 186 ride upon the surfaces 183 of flanges 181 and when the tube 36 is urged toward the opening 182, the flanges 186 are forced together so as to close the slot 187. For this purpose, one or more screws 188 are employed which are screwed into bosses 189 formed on the rear wall 178 of housing 176 and which engage the rear wall 184 of tube 36 and force it against the surfaces 183 of housing 176 and force the flanges 186 together to reduce the width of the slot 187. By proper adjustment of the slots 187 of the tubes 36 and 37, the proper proportion of liquid may be discharged from each tube.

While it may be desirable to have all of the metering tubes 36, 37, 43 and 44 adjustable, it can readily be comprehended that one only of each pair may be made adjustable, the other tube of the pair having a fixed slot, or if the proportions and capacity be accurately determined, the slots of all of the tubes may be fixed.

The metering tubes are arranged in their respective reservoirs so that the lowermost ends of the slots are at the bottom of the reservoir or at the same height above the bottom and so that the said slots extend above the maximum height of the liquid. Also, the slots are arranged in facing relation, being relatively close together to avoid inaccuracy in metering in the event of tilting of the column 10. The metering tubes are used in pairs and the vertical slot in each tube is of uniform width throughout its height. The width of the slot in each metering tube of a pair is in an exact relationship with the width of the slot of the other metering tube, so that the flow orifice areas of each of the two slots remain in a constant and uniform proportion, regardless of the height of liquid in the reservoir. The result of this construction is that a fixed volumetric ratio of flow through the tubes of each pair is established. This exact ratio of flow will remain the same regardless of the total volume of liquid collected in the reservoir. This feature of construction is very vital in securing automatic operation of the apparatus under varying conditions.

In the lowermost portion of the case 24 of rectifier 12 is formed a reservoir 153 which has an outlet 154 adapted to be closed by a valve 155. A float 156, controlled by the height of the liquid in the reservoir 153, operates valve 155. The outlet 154 is connected by means of a pipe 157 with the case 22 and communicates with the interior of said case at an elevation intermediate the upper and lower ends of said case.

Disposed exteriorly of the rectifier 11 is a reservoir 159 for liquid which has an outlet 161 at the lowermost portion thereof. This outlet is adapted to be closed by means of a valve 162 which is controlled through a float 163 disposed in said reservoir which is operated by the elevation of the liquid within said reservoir. The lowermost portion of the reservoir 159 has connected to it a pipe 168 which communicates with the metering tube 36 in reservoir 35 of rectifier 11. An equalizing pressure vent 169 communicates with the reservoir 159 at a point above the maximum elevation of the liquid in said reservoir and with the interior of the case 22 of rectifier 11 below the reservoir 35. The outlet 161 of said reservoir is connected by means of a pipe 171 with the chamber 121 of the evaporator condenser 13. The other metering tube 37 in the reservoir 35 communicates directly with the interior of the case 22 and discharges into a reservoir 129 to be subsequently described.

A reservoir 164, similar to reservoir 159, is employed which is disposed exteriorly of the rectifier 12 and which has an outlet 165 closed by a valve 166 and operable by a float 167. The metering tube 43 in reservoir 42 discharges directly into the upper portion of reservoir 164, while the outlet from said reservoir is connected by means of a pipe 172 with the case 22 of rectifier 11 at the uppermost portion thereof. A passageway 202 communicates with the upper portion of reservoir 164 and the interior of column 12 at its upper end and serves as a pressure equalizing passageway to permit a free flow of liquid into said reservoir.

In the evaporator condenser 13 is formed the reservoir 129 previously referred to, which communicates with the space above the tubes 29 and at its lower end with the interior of chamber 122, by means of a tube 131. In the reservoir 129 is mounted a float 132 which operates a valve 130 including a sliding valve member 133. Valve member 133 is in the nature of a piston which is connected to a piston rod 196 and is slidable in a cylinder 197. The piston 196 is guided for sliding movement in a guide 198 connected to the cylinder 197 and supported by the reservoir 129. The cylinder 197 is formed with three ports 134, 135 and 137, the ports 134 and 135 being disposed in juxtaposition at the side of the cylinder intermediate the ends thereof, while the port 137 is at the far end of the cylinder and is connected by means of a pipe 199 with the case 22 of rectifier 11, intermediate the upper and lower ends thereof. The valve 133 is operable to bring the two ports 134 and 135 into communication or to prevent flow therebetween. Valve 133 has a passageway 136 through the same which communicates through the port 137 and pipe 199 with the interior of the case 22 of rectifier 11. The gas from any leakage that may escape past the walls of piston 133 is vented through passageway 136 and does not affect the movement of piston 133.

The compressor 16 is of the diaphragm type, has a case 45 and a diaphragm 46 operated by means of a crank 47 through a connecting rod 48. Case 45 is provided with an air inlet 49 and an air outlet 51 controlled by suitable valves.

The air cooler 17 comprises a case 52 having a coil 53 therein. Cooling water is directed into the coil 53 by means of a pipe 54 and leaves the said coil through a drain pipe 55.

The air to be separated into its constituent gases is drawn into the case 45 of the compressor 16 through inlet 49 and leaves through outlet 51, being directed into the bottom of the case 52 of the cooler 17 by means of a pipe 56. Case 52 is further connected at its upper end by means of a pipe 57 to the valve mechanism 18. The bottom of the case 52 has connected to it a discharge pipe 191 which, in turn, is connected to a trap 192. This trap has a float valve 193 which controls the flow of liquid through the trap 192. When the liquid in trap 192 reaches a certain level, the surplus drains out through an overflow pipe 194 which is connected to the drain pipe 55. This trap serves to remove a certain proportion of the water of the air to be fractionated which condenses out of the air on the compression and subsequent cooling thereof.

The valve mechanism 18 consists of two cylinders 58 and 59 having coaxial bores and provided with a piston rod or valve stem 61 carrying two pistons or valve members 62 and 63 operable in cylinder 58 and four pistons 64, 65, 66 and 67 operable in cylinder 59. The cylinder 58 has a centrally located port 68 and two spaced ports 69 and 71, one on each side of the central port. The cylinder 59 has a central port 72 and two ports 73 and 74 corresponding to the ports 69 and 71. In addition, the said cylinder has two other ports 75 and 76 which are spaced apart a distance greater than the two ports 73 and 74, and which are disposed one on each side of the port 72. The pipe 57 is connected to two branch pipes 77 and 78 which are respectively connected to the ports 68 and 72. The two ports 75 and 76 are both connected to a common passageway 79 which is connected to a pipe 200. This pipe may be connected to a gas collection system which has not been shown in the drawings.

The heat exchanger 19 consists of two conduits 81 and 82 which are of appreciable length and/or area and which are in intimate heat-conducting relation with respect to one another. In the drawings, this heat exchanger has been shown as having two conduits, though it can be readily comprehended that two sets of conduits connected together in any suitable manner, may be used in place thereof. The conduit 81 is connected to port 69 and the conduit 82 to port 71 of cylinder 58 of valve mechanism 18.

In the heat exchanger 21 are employed three conduits 84, 85 and 86, all in heat-exchanging relation with respect to one another. The conduits 84 and 85 may be formed by means of two tubes in heat conducting relation with respect to one another and surrounded by an outer tube which forms the conduit 86 which extends about and is in heat-conducting relation with respect to both of the conduits 84 and 85. Conduit 84 is connected to ports 73 and conduit 85 is connected to port 74 of the cylinder 59 of valve mechanism 18.

While I have shown the heat exchanger 21 constructed with two juxtaposed tubes arranged within a third, it can readily be comprehended that any other suitable construction, such as is now known in the art, may be used.

The heat exchanger 14 consists of a case 87 in which are disposed three coils 88, 89 and 91. The coils are placed so that the air flowing through case 87 contacts the inlet end of each coil first. Case 87 and coils 88, 89 and 91 can be replaced with any other construction which would provide the necessary amount of heat transfer surface placed in the same general relationship. All of these coils are in heat-conducting relation with respect to the gas or liquid which may flow through the case 87.

Connected to the heat exchanger 19 is a valve mechanism 92. This valve mechanism consists of a housing 93 having a partition 94 therein forming within said housing three chambers 95, 96 and 97. Two valves 98 and 99 control communication between the chamber 97 and the chamber 95 and between the chamber 97 and the chamber 96. These valves are automatic and operate in alternation. The chamber 95 has a port 101, while the chamber 96 has a port 102. These ports are normally closed by spring-controlled valves 103 and 104. The conduit 81 of heat exchanger communicates with chamber 95, while the conduit 82 of said heat exchanger communicates with the chamber 96.

The heat exchanger 21 has connected to it a valve mechanism 105 similar to the valve mechanism 92. This valve mechanism includes a housing 106 and partition 107 forming in the housing chambers 108, 109 and 110. Alternately operable valves 111 and 112 bring the chamber 110 into communication with the chambers 108 and 109. Spring-operated valves 113 and 114 bring the chambers 108 and 109 into communication with outlet ports 115 and 116. The conduit 84 of heat exchanger 21 communicates with chamber 108, while the conduit 85 of said heat exchanger communicates with the chamber 109.

The expansion engine 15 is of the diaphragm type and is provided with a case 140, a diaphragm 142 associated therewith and is operable through a connecting rod 141, and a crank 143. Case 140 has an outlet 144 and an inlet 146. The valve mechanism of the expansion engine 15 may be operated by cams or in any other suitable manner. There must be connected to the output shaft of the expansion engine a device which provides a load of uniform torque characteristics, regardless of the speed of the engine. This device is not shown on the drawings, but could consist of an electrical generator for work recovery. On small units, the recovered work is of little value and the work of the expansion engine can best be absorbed by a friction device located exteriorly of heat insulation used to contain the expansion engine.

The oxygen is removed from the apparatus at a pressure below atmospheric. For this purpose, a compressor 174 is utilized. This compressor is of the diaphragm type and is similar to compressor 16. This compressor raises the pressure up to that necessary to fill tanks or supply oxygen consuming apparatus. Since diaphragm compressors operate without lubrication, the danger resulting from highly compressed oxygen and lubricating oil is entirely eliminated. The outlet pipe 175 of the compressor 174 is connected to any desired collection or consumptive system for oxygen.

The various parts of the fractionating apparatus of my invention are connected to one another in the following manner.

The upper end of the coil 89 of heat exchanger 14 is connected by means of a pipe 127 with the upper end of the case 22 of rectifier 11. The lower end of this coil is connected by means of a pipe 128 with both of the ports 115 and 116 of valve mechanism 105. Outlet 144 of expansion engine 15 is connected by means of a pipe 145 with the upper end of the coil 91. Inlet 146 of said expander is connected by means of a pipe 139 with the port 135 of cylinder 197. The lower end of the coil 91 of heat exchanger 14 is connected by means of a pipe 147 with both of the ports 101 and 102 of valve mechanism 92. The chamber 119 of evaporator condenser 13 is connected by means of a pipe 125 with the upper end of the coil 88 of heat exchanger 14, while the lower end of said coil is connected by means of a pipe 126 to the upper end of the conduit 86 of heat exchanger 21. Conduit 86 of heat exchanger 21 is connected at its lower end by means of a pipe 173 to the compressor 174. The case 87 of the heat exchanger 14 is connected at its upper end with a pipe 148, which, in turn, is connected with the valve mechanism 105 and communicates with the chamber 110 thereof. The lower end of the case 87 of heat exchanger 14 has two outlets 203 and 204 communicating with pipes 149 and 152, respectively. Outlet 203 is located lowermost in case 87 of heat exchanger 14 and discharges therefrom any condensate formed by coils 88, 89 and 91 in heat exchanger 14. Condensate flowing from outlet 203 passes through pipe 149 and enters rectifying column 12 at a point approximately half way between the bottom and top of the trays 25 contained therein and cascades over the lower half of the trays to the bottom of the column. The pipe 149 is formed at 151 in the shape of a liquid trap to prevent the flow of vapor through pipe 149. Air which is not condensed in heat exchanger 14 passes through outlet 204 located near the bottom of case 87 and thence through a pipe 152 to the lower end of column 12 at a point below the trays 25.

In describing the operation of the apparatus, I will first assume that the apparatus is in operation at full capacity and that all component parts have reached a state of equilibrium. The figures which will be given are based on ideal conditions such as would be obtained if the design and construction of the apparatus were of the highest order and are only approximate.

I will describe first the operation of column 10. Reservoir 35 is partly filled with liquid oxygen of high concentration. The boiling point of this liquid oxygen is determined by the pressure in the rectifier 11 which is maintained close to atmospheric pressure by the gas collection system attached to pipe 200 which communicates with rectifier 11 through the valves and conduits previously described. The boiling point of this liquid oxygen would be —183° C. As there is no input of heat into the reservoir 35, the liquid oxygen does not boil, but flows through metering tubes 36 and 37. Metering tube 36 is proportioned to discharge by gravity 21% of the available liquid into reservoir 159. The remaining 79% of the liquid oxygen being discharged through metering tube 37 into reservoir 129. The oxygen discharged into reservoir 129 passes through the tube 131 and into the interior of tubes 29 where it is caused to boil at —183° C. as will be presently described. The oxygen in reservoir 159, after filling the reservoir and lifting the float 163, flows through tube 171 into the interior of tubes 123. The space above the tubes 123 is kept at a pressure a little below that in the rectifier 11 by pump 174, so that the boiling point of the liquid oxygen in these tubes will be a little lower than —183° C. Float valve 162 maintains a continuous pressure seal between the interior of tubes 123 and the interior of rectifier 11, with the result that at no time, regardless of the action of pump 174, can any gas or fluid be drawn by pump 174 from rectifier 11, except that which passes through metering tube 36. This is essential to preserve the balance of the column under various operating conditions.

The heat required to vaporize the oxygen in tubes 123 and 29 is supplied by relatively pure nitrogen gas under pressure which surrounds the tubes. Since the pressure in rectifier 11 is atmospheric, the temperature of the liquid oxygen in the interior of the tubes 123 is +183° C. In the rectifier 12, the pressure is four atmospheres. However, at four atmospheres pressure and —182° C., nitrogen liquefies. Hence, with a slight temperature difference between the nitrogn gas in rectifier 12 and the liquid oxygen in rectifier 11, a heat transfer takes place and the oxygen in tubes 123 is evaporated and the nitrogen gas about said tubes is condensed. Since the temperature at which liquefaction of the nitrogen occurs can be controlled by varying the pressure, the compressor 16 is operated at a pressure such as to produce the results above referred to. The nitrogen gas that surrounds the tubes 123 and 29 enters the evaporator 13 through passageway 33 and contacts tubes 123 before reaching tubes 29. This fact, together with the fact that the oxygen in tubes 123 boils at a little lower temperature than the oxygen in tubes 29, due to the reduction in pressure caused by compressor 174, causes all of the oxygen in tubes 123 to be evaporated first, and insures the complete removal of all oxygen liquid flowing through metering tube 36. This feature is utilized to secure automatic operation under all operating conditions.

The oxygen gas vaporized in tubes 29 rises in rectifier 11 and passes progressively over the trays 23 in the rectifier, said trays being covered by a cascading reflux liquid which enters the rectifier as will be presently described. At the top of rectifier 11, relatively pure liquid nitrogen enters through pipe 172 and cascades downwardly over trays 23. The boiling point of the liquid nitrogen at the pressure maintained in rectifier 11 is —195° C. This is 12° C. less than the boiling point of the oxygen in the lower end of the rectifier 11. As the oxygen gas rises in the rectifier and passes over the trays, it contacts a colder fluid. The result is that part of the oxygen gas condenses, giving up its latent heat to the colder liquid. The latent heat given to the colder liquid in the tray vaporizes some of this liquid because it is more volatile and is warmed above its vaporization temperature. The action described is progressive in nature, so that by the use of a sufficient number of trays, the bottom tray will contain practically pure liquid oxygen at —183° C. and the top tray will contain practically pure liquid nitrogen at —195° C. Intermediate trays will contain mixed liquids having a larger percentage of nitrogen towards the top and a larger percentage of oxygen towards the bottom. The boiling points of the mixed liquids in the various trays will also progressively increase from top to bottom. As the oxygen gas rises through the rectifier 11, it is gradually replaced by nitrogen gas as described above, so that before it reaches the top of the rectifier, the replacement has been complete and pure nitrogen gas is discharged by pipe 127.

In the actual operation of the apparatus, more liquid in the form of oxygen is evaporated in tubes 29 and 123 than is supplied to the rectifier in an equivalent quantity of liquid nitrogen entering the top of the rectifier. The volume of pure liquid nitrogen delivered at the top of rectifier 11 equals approximately 55% of the volume of the liquid oxygen which is evaporated at the lower end of the rectifier. To off-set this difference, an additional quantity of reflux liquid enters the rectifier 11 through pipe 157. This additional liquid is equal to approximately 45% of the total liquid entering the rectifier 11 and consists of a mixture of approximately 47% oxygen and the balance nitrogen. This mixture is introduced onto the trays 23 at a point approximately midway between the top and bottom, where the liquid cascading from above has a similar composition to that entering through pipe 157.

The liquid nitrogen which condenses around tubes 123 and 29 collects in reservior 42 and flows through metering tubes 43 and 44. Metering tube 43 is constructed to discharge approximately 60% of the liquid nitrogen collected in reservoir 42 through pipe 172 to the top of column 11. Float valve 164 maintains a continuous fluid seal between rectifier 12 and rectifier 11, so that no gas can flow from rectifier 12, which has an internal pressure of four atmospheres, through pipe 172 to rectifier 11, which has a pressure of only one atmosphere.

Metering tube 44 is constructed to discharge approximately 40% of the liquid nitrogen collected in reservoir 42, said discharge being directed to the top tray in rectifier 12, from which it cascades to the bottom of the rectifier. Air in gaseous form at a pressure of four atmospheres and temperature of —178° C. is introduced into the rectifier 12 at the lower end thereof through pipe 152 from heat exchange 14. As the liquid nitrogen cascades over the trays 25 in the rectifier 12, it comes in contact with some of this air which contains 21% oxygen gas at the point of entry at the bottom of column 12. Some of the oxygen gas is progressively condensed in a manner similar to that described for rectifier 11. The result is that air which enters rectifier 12 at the bottom is able to supply less volatile oxygen for replacement of part of the descending liquid nitrogen to the extent that the bottom tray will contain a mixture of approximately 47% liquid oxygen having a boiling point of approximately —178° C. If enough trays are used, all of the original 21% oxygen gas contained in the air will have been exchanged for nitrogen gas by the time the gas reaches the top tray in rectifier 12, so that pure nitrogen gas is all that remains to condense around tubes 123 and 29.

A small quantity of air is condensed in heat exchanger 14 and this liquid is conducted by a pipe 149 to a point in rectifier 12, where it will meet a liquid cascading over the trays that is of a similar composition and the combined liquids will continue to cascade to the bottom of the rectifier where the resulting liquid will contain 47% oxygen as described.

The liquid collecting in the bottom of the rectifier 12 raises float 156 and discharges through pipe 157 to rectifier 11. Float valve 155 serves to maintain a liquid seal and prevent the escape of gases from rectifier 12 in the same manner as float valve 164.

When the liquid nitrogen contained in reservoir 164 is allowed to pass through outlet 165, it is subjected to a drop in pressure. This drop in pressure lowers the boiling point of the liquid nitrogen, so escaping, about 12° C. The result is that a small amount of the liquid nitrogen immediately vaporizes to cool the body of the liquid to the lower boiling point occasioned by the drop in pressure. Pipe 172 therefore discharges into rectifier 11 a mixture of liquid nitrogen and gaseous nitrogen and the amount of nitrogen vaporized in this manner represents a loss of liquid to the column 10. This loss is compensated for by the fact that the nitrogen gas discharging from the top of column 11 has a temperature 12° C. lower than is required to liquefy air under a pressure of four atmospheres. The heat absorbing capacity of the nitrogen gas discharging through pipe 127 is therefore utilized by passing this gas through a coil 89 contained within the heat exchanger 14. Within this exchanger, the coil is surrounded by incoming air under a pressure of four atmospheres and some of this air is condensed, dropping to the bottom of the exchanger and discharging through pipe 149 to rectifier 12 wherein it is discharged through float valve 155 and pipe 157 to rectifier 11. Thus, a quantity of liquid reaches rectifier 11 which is equal to that lost by the partial vaporization of the nitrogen discharging into rectifier 11 through pipe 172.

In rectifier 12, the liquid discharging through float valve 155 is also subjected to a drop in pressure with the result that pipe 157 discharges a mixture of liquid and gas into rectifier 11 for the same reason that pipe 172 discharges a mixture of nitrogen gas and liquid nitrogen into rectifier 11. This loss is also compensated for in a similar manner by an additional flow of cold gases through pipe 127 and coil 89 in heat exchanger 14 resulting in an additional compensating quantity of liquid being added to rectifier 12 through pipe 149.

When liquid oxygen collected in reservoir 159 is discharged through valve 162 into tubes 123 to be evaporated, it is subjected to a lower pressure induced by pump 174. The lower pressure in these tubes results in part of the liquid oxygen being evaporated to compensate for the lower boiling point of the liquid oxygen in the tubes. The result is that the oxygen gas passing through pipe 125 has a lower tempertures than required to condense the air in exchanger 14, which is under a pressure of four atmospheres. This heat absorbing capacity of the cold oxygen gas discharging through pipe 125 is not very large and the small coil 88 placed in heat exchanger 14 condenses an additional part of the air passing therethrough, said condensate also entering rectifier 12 through pipe 149.

Air under a pressure of four atmospheres passes through heat exchanger 19 and is cooled in a manner which will be subsequently described, to a temperature of approximately —178° C. At this temperature and pressure, the air flows through pipe 138 to control valve 130. Control valve 130 is operated by the rise and fall of float 132 which responds to the rise and fall of the liquid in evaporator condenser 13 of column 10. As the supply of liquid in evaporator condenser 13 decreases, valve 130 opens and permits the flow of air through ports 134 and 135 and pipe 139 to expansion engine 15. The refrigeration produced by expansion engine 15 results in an additional supply of liquid reaching the evaporator condenser 13 of column 10, as will be later described. As this additional liquid reaches the evaporator condenser 13, valve 130 partially closes port 135 and restricts the flow of air to the expansion engine 15. Thus, expansion engine 15 operates continuously at a controlled speed which is directly in proportion to the requirements of evaporator condenser 13 for additional liquid to keep the column 10 in a state of thermal balance.

In order that piston 133 will operate freely in valve 130, it is necessary for a slight clearance to be maintained between the walls of the valve body 197 and the sides of the piston 133. This slight clearance results in the escape of a small quantity of high pressure air from ports 134 and 135. Said escaping air is discharged into the rectifier 11 at a point where the composition of the gas within the rectifier is approximately the same as said air discharged into the rectifier 11 by valve 130. A small amount of air discharged into the column, as described, will be completely rectified without destroying the balance of the column or decreasing the purity of the products of the fractionation because of the fact that there is a quantity of pure liquid nitrogen flowing into the top of rectifier 11 through pipe 172 that is in excess of that required to wash down all of the oxygen gas normally present in the rectifier. The oxygen gas present in the leakage air discharging into rectifier 11 causes a loss of evaporator liquid in condenser evaporator 13 equal to the quantity of said oxygen gas and this loss must be offset by additional refrigeration provided by expansion engine 15. Consequently, it is desirable to hold the leakage around piston 133 to a very minimum.

In order to compensate for heat losses due to infiltration through the insulation and inefficiency in the operation of the apparatus, additional refrigeration is employed which is provided by the expansion engine 15.

Due to the fact that engine 15 is performing work, the expansion of the air in engine 15 materially cools the same. Because the air entering the engine is at a low temperature of —178° C., the expansion and additional cooling that takes place in the engine results in the air exhausting from the engine through pipe 145 having a temperature as low as —192° C. The exhaust air from engine 15 passes through pipe 145 into coil 91 located in the heat exchanger 14. Because the air surrounding coil 91 in heat exchanger 14 will begin to condense at a temperature of —177° C., due to its pressure of four atmospheres, the air from the engine absorbs heat and condenses air in heat exchanger 14 until it reaches a temperature of approximately —178° C. at which temperature it leaves the heat exchanger 14 through pipe 147. Thus, some of the air in heat exchanger 14 is condensed. The air condensed by coil 91 in heat exchanger 14 drops to the bottom of the exchanger and flows through pipe 149 to rectifier 12. Thus, the expansion engine 15 indirectly supplies column 10 with the liquid necessary to compensate for the heat losses of the apparatus and operates automatically as required.

When air compressed to a pressure of four atmospheres flows through heat exchanger 14, it cannot be cooled to a temperature lower than —177° C., because at this temperature it begins to condense and any additional heat extracted from said air is supplied from the latent heat of the condensing air. For this reason, the cooling gases discharging from the coils 88, 89 and 91 of heat exchanger 14 will be of a temperature only slightly colder than the compressed air surrounding the coils. The temperature of the gases flowing from the coils through pipes 147, 128 and 126 should be approximately —178° C. or about 1° C. colder than the compressed air surrounding the coils in the heat exchanger 14. Since the temperature of the gases discharged from coils 88, 89 and 91 is above the liquefaction temperature of air at four atmospheres, it will be readily comprehended that no liquefaction of air takes place in either of the heat exchangers 19 or 21.

The flow of the gases through the valves 18, 106 and 92 and through the heat exchangers 19 and 21 may be traced as follows: When the piston rod 61 of valve mechanism 18 is in the position shown in Fig. 1, air is drawn into the inlet 49 of compressor 16, is compressed by the compressor to approximately four atmospheres and passes out through the outlet 51 and pipe 56 into the case 52 of the cooler 17, where the cool water which flows through the coil 53 of said cooler brings the temperature of the compressed air back to approximately ambient temperature. The air so cooled and compressed passes through the pipe 57 and the branch pipe 78 into the cylinder 59 of the valve mechanism 18 and leaves the same through the port 74, flowing along conduit 85 of heat exchanger 21. As the air flows along this conduit, the temperature thereof is progressively reduced, until it leaves valve mechanism 105 where it passes through chamber 109 and into chamber 110, leaving said latter chamber through pipe 148 and entering the uppermost portion of the case 87 of heat exchanger 14. At the same time, oxygen gas flows through pipe 125, coil 88 and pipe 126 and through the conduit 86 of heat exchanger 21, which is in heat-conducting relationship relative to the other two conduits. Also nitrogen gas flows through pipe 127, coil 89, pipe 128 and to the valve mechanism 105. In said valve mechanism, the nitrogen enters chamber 108 through port 115 and flows through conduit 84 of heat exchanger 21. The temperature of both the nitrogen and oxygen is about −178° C. on entering the heat exchanger 21. Due to the fact that the weight of the oxygen and nitrogen entering the heat exchanger 21 is about equal to the weight of the air entering the same, and due to the fact that the air flows in a direction opposite to the direction of flow of the other gases in said heat exchanger, the corresponding temperatures throughout the heat exchanger will be substantially the same. Thus, the temperature of the air discharged from exchanger 21 would be about −177° C. which is the temperature at which air condenses at the pressure of four atmospheres. Also the nitrogen and oxygen leaving the exchanger are at substantially ambient temperature. The oxygen is removed from exchanger 21 by means of pump 174 which operates at a slight vacuum to maintain the pressure of the oxygen at slightly below the pressure of the nitrogen in column 11. The nitrogen leaves the valve 18 through pipe 200 from which it may be disposed of as desired.

The heat exchanger 19 functions similarly to the exchanger 21 with the terminal temperatures about the same. Air discharging from the expansion engine 15 passes through pipe 145, coil 91, pipe 147 and to the valve 92. In the said valve, this air enters chamber 95 through port 101 and leaves said valve, flowing through conduit 81 of heat exchanger 19. The air, on leaving the heat exchanger 19, enters valve 18 through port 69 and is discharged from said valve to the atmosphere. A part of the air furnished by compressor 16 flows through branch pipe 77, port 68 and port 71 of valve 18 and from this valve, through the conduit 82 of heat exchanger 19. The air, on leaving said heat exchanger, enters chamber 96 of valve mechanism 92, from which it flows through valve 99 and into pipe 138. Pipe 138 conducts the air to the valve 130, from which it travels as previously described.

Since the air entering case 87 of heat exchanger 14 through pipe 148 is at the condensation temperature and pressure, the cooling done by coils 88, 89 and 91 will result in the formation of condensate which travels through the apparatus as previously described.

When piston rod 61 of valve mechanism 18 is moved to the left of the position as viewed in Fig. 1, by any suitable mechanism not shown, the air entering heat exchanger 21 is caused to travel along conduit 84 and the nitrogen caused to travel along conduit 85. Valve 105 automatically adjusts itself to the change in flow. Also, the incoming air entering the exchanger 19 is transferred from conduit 82 to conduit 81 and the outgoing air caused to travel through conduit 82. Likewise, valve 92 automatically adjusts itself to the change. Operation of the piston rod 61 is preferably performed periodically by automatic means, so that the transfer of flow is automatically accomplished at regular intervals.

Each time that the valve mechanisms attached to the heat exchangers 19, 21 operate, a small volume of compressed air is lost from one of the conduits to the atmosphere. For this reason, it is desirable that the volume of the conduits which comprise said heat exchangers be kept as low as practicable. The low pressure used by my invention helps to minimize this loss and with a good design of heat exchanger, the loss becomes negligible.

Air that is compressed has a capacity for holding water vapor that is approximately in inverse proportions to its volume. Thus, air at a pressure of one atmosphere has four times as much capacity for holding water vapor as it has after being compressed into a space one fourth as large in which confinement it would have a pressure of four atmospheres. The capacity of air to hold water vapor is also a function of its temperatures, the higher the temperature, the greater the capacity for holding water vapor. With these facts in mind, I will describe the manner in which water vapor contained in the atmosphere is eliminated from the critical parts of my invention where its presence would soon make the apparatus inoperative.

Air drawn into the intake 49 of compressor 16 may be of any degree of saturation, depending on the local atmospheric conditions. For the purpose of illustration, the relative humidity in the atmosphere may be considered to be of a percentage over 25%. The air, being compressed to a pressure of four atmospheres and cooled to ambient temperature by cooler 17, would reach a supersaturated condition and any water vapor in excess of that required to saturate the compressed air would be condensed out and collected in cooler 17, the condensate being disposed of as previously described through float valve 192 and waste pipe 194. The saturated compressed air is carried by pipe 57 to valve mechanism 18, previously described, and flows through one of the conduits 84 or 85 in heat exchanger 21 or in one of the conduits 81 or 82 of heat exchanger 19. As the compressed air flows through the conduit, it is progressively cooled. As it cools, the saturation point lowers and a film of moisture is deposited on the walls of the heat exchanger. This continues until the temperature of the air has dropped so low that practically all of the water vapor has been deposited on the walls of the exchanger. As the air reaches the lower temperatures, the carbon dioxide present in small quantities is also deposited on the walls of the heat exchangers. After a short time interval, during which time the moisture and carbon dioxide deposited on the walls of the heat exchanger has formed nothing more than a thin film, the valve mechanisms 18, 92 and 105 located at each end of the exchangers are caused to operate in the manner previously described, so that the exhausting air and nitrogen pass through alternate conduits relative to the incoming compressed air. The exhaust air and nitrogen gases have previously been dehydrated when they passed into the apparatus through the heat exchangers. When they pass through the exchangers on the way out of the apparatus, they are expanded to four times the volume they had when they went in, and they therefore have four times the capacity to absorb moisture that the ingoing compressed gases had to contain it. At each point in the length of the exchanger, the temperature of the outgoing gases is very close to the temperature of the incoming gases, so that the film deposited at each point along the walls of the heat exchangers is readily evaporated by the outgoing gases and the apparatus is kept free from large deposits of solid water or carbon dioxide which would be detrimental to the continuing operation of the apparatus.

Having described the operation of my invention after it has reached a state of equilibrium and is operating at full capacity, I will now described the manner in which it automatically comes to full capacity from a warm start by merely starting the air compressor into operation.

Air compressor 16 and oxygen compressor 174 are started simultaneously. The column 10 and the entire apparatus may be considered at ambient temperature. For this reason, there will be no liquid anywhere in the apparatus. Float valves 155, 162 and 166 will remain closed against their seats. Float 132 will fall against a stop 232 at which position ports 134 and 135 of valve 130 will be in full communication, permitting a maximum quantity of air to reach expansion engine 15. As the only air which can pass through the system at this time is that which passes through the engine, it will be necessary to provide an engine capable of absorbing the entire output from compressor 16, or as an alternate method, compressor 16 can be regulated by an automatic pressure governor, not shown in the drawings, which would provide a constant output of air under pressure from compressor 16, regardless of the quantity of air required.

As previously stated, the only place that the air can flow when the apparatus is first put in operation, is through the expansion engine and out through the coil 91 in heat exchanger 14 and through heat exchanger 19. The cooling affect produced in the expansion engine is not enough to liquefy the air at first, but the cool exhaust air flowing through the exchangers cools the incoming air which is further cooled by expansion in a continuously regenerative cycle until the air expanding from the engine which passes through coil 91 reaches a temperature of −177° C. When this temperature is reached, air surrounding coil 91 begins to condense, flowing through pipe 149 into rectifier 12 where it descends, filling reservoir 153 and opening float valve 155 From there, the liquid air flows through pipe 157 to rectifier 11, where it cascades over the lower of trays 23 and collects in reservoir 35. The very first quantities of liquid collecting in reservoir 35 are distributed in the correct proportions as previously described, by metering tubes 36 and 37. The liquid air discharging from tubes 36 and 37 flows into tubes 123 and 29, cooling the same and causing air to start condensing on the outside of said tubes because of the higher air pressure on the outside.

The condensation which forms around the outside of tubes 123 and 29 collects in reservoir 42, where it is immediately separated into two streams of the correct proportions by metering tubes 43 and 44. Part of the liquid is thus deposited on the top of trays 25 in rectifier 12 and part of said liquid fills reservoir 164. After filling said reservoir 164, the liquid passes through valve 166 and pipe 172 to the top of rectifier 11, where it cascades over trays 23, cooling and filling the same. As the column 10 is gradually cooled to operating temperature, the gases exhausting through coils 88 and 89 begin to help the expansion engine in the production of liquid air in the heat exchanger 14.

While the column 10 is being cooled down and the various parts are being filled with liquid, the liquids in all parts of the system are of mixed composition. The first place that rectification begins to take effect is in rectifier 12, where the air passing upwardly over trays 25 begins to lose more and more of its oxygen and the liquid collecting in reservoir 42 increases its nitrogen content until pure nitrogen is being collected. As pure nitrogen begins to flow through pipe 172 into rectifier 11, the process of rectification begins to take place in this rectifier and the liquid collecting in reservoir 35 becomes oxygen of increasingly high purity, until a state of equilibrium is reached.

When reservoir 129 becomes filled with liquid, float 132 raises and expansion engine 15 is throttled until it is providing just enough refrigeration to keep the entire apparatus in a state of perfect balance.

The normal composition of the atmosphere contains .94% of argon and minute traces of other inert gases. In the operation of the rectifier 11, it is possible to adjust the proportionate flow of metering tubes 36 and 37, so that the argon, which has a boiling point below oxygen and above nitrogen, can be caused to leave the apparatus as an impurity of either the oxygen or the nitrogen, depending upon which of the products of the fractionation is desired in the highest state of purity. Where the argon must be eliminated from both the nitrogen and oxygen, an additional rectifying apparatus, not shown on the drawings, would have to be provided.

Figures 2, 3:
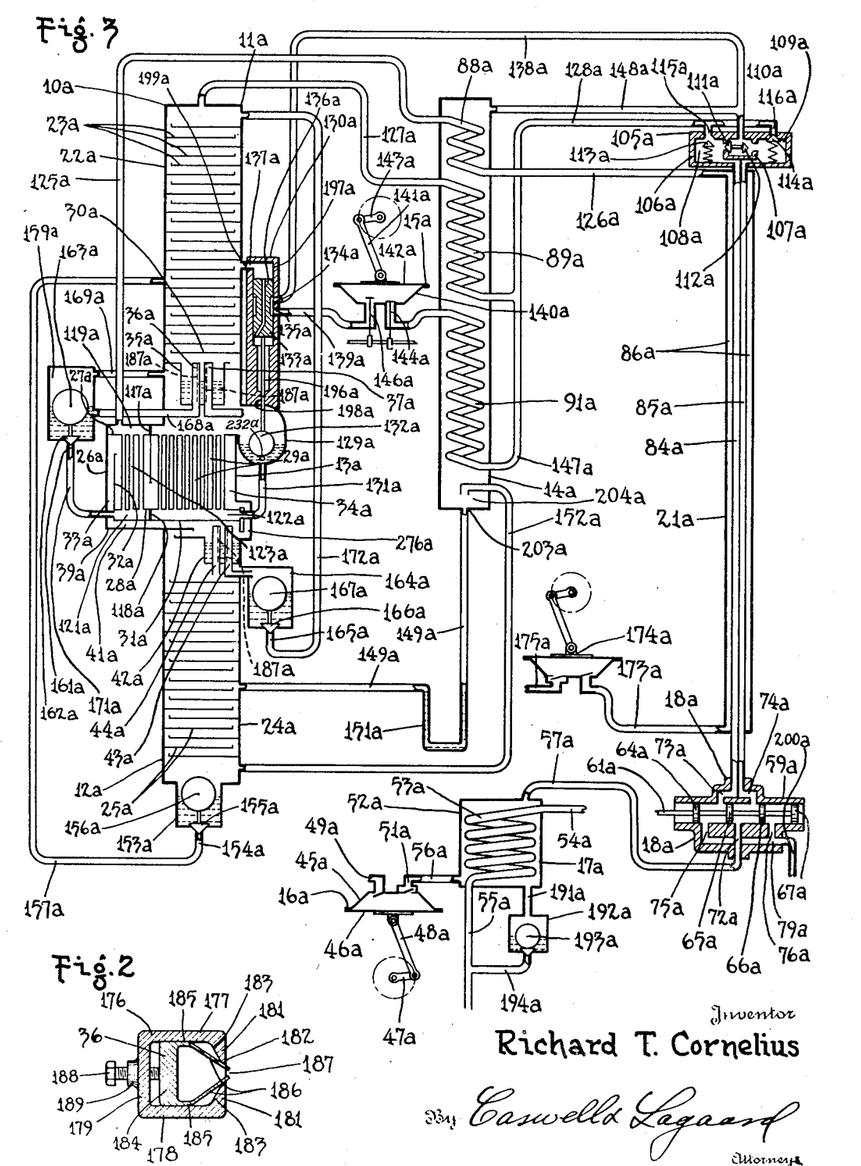
Fig. 2 is a cross sectional detail view of one of the metering tubes of the invention.
Fig. 3 is a diagrammatic view similar to Fig. 1 of a modification of the invention for the use solely in the production of oxygen.

In Fig. 3, I have shown a modification of the invention in which only oxygen is collected and in which the nitrogen is wasted. Inasmuch as this apparatus is similar to that shown in Fig. 1, the description of the corresponding parts will not be repeated and the same reference numerals, to which the suffix "a" has been added, will be used to designate corresponding parts.

In the form of the invention shown in Fig. 3, the heat exchanger 19 is dispensed with. In this case, the pipe 138a, which was connected to the valve 92, is directly connected to the pipe 148a, which leads to the valve 105a. Similarly, the pipe 147a, which was connected to valve 92, is directly connected to the pipe 128a, which also leads to the valve 105a. At the same time, the valve 92 and the portion of the valve 18 including cylinder 58, pistons 62 and 63, and branch pipes 77 and 78 are dispensed with, and pipe 57a from the cooler 17a being connected directly to the port 72a of valve mechanism 18.

The result is that the supply of air for both the rectifying column 10a and air expansion engine 15a pass through the same conduit in heat exchanger 21a and the exhaust air from expansion engine 15a and the nitrogen from column 18ᵃ are mixed and pass through a single conduit in heat exchanger 21ᵃ in counterflow to the incoming air.

When heat exchangers 19 and 21 are combined into a single heat exchanger, such as shown by heat exchanger 21ᵃ in Fig. 3, the principle of operation remains the same. This is true because the gases flowing in opposite directions have equal mass. The same temperatures prevail as when two heat exchangers, such as 19 and 21, are used, the only difference being that when one heat exchanger is used, the air discharging from the expansion engine pollutes the nitrogen, making it unsuitable for use. The single heat exchanger 21ᵃ, shown in Fig. 3 would always be used where oxygen gas alone was the only product desired from the fractionating process.

The advantages of my invention are manifest. By metering the liquids formed from the constituents of the air, the device becomes entirely automatic and does not require adjustment. When the apparatus is used on aircraft at different altitudes, a wide variation of exhaust pressures below the normal sea level pressures will be automatically compensated for and the apparatus will continue to function satisfactorily without manual attention.

It is common practice in the operation of conventional fractionating apparatus to expand most of the air handled before passing it into the rectifying column. In order to permit a satisfactory expansion ratio, the air must be compressed to a pressure several times the pressure used in the rectifier. With my invention, the air which is expanded for refrigeration purposes is not used for supplying the rectifier, and the amount of pressure required at the rectifier is also ample for the expansion engine. Because the volume of air required in the expansion engine is quite low compared to the total volume of air handled and because all of the air used in the apparatus requires a pressure of only four atmopheres, the total power requirements are as low as is theoretically possible.

The low operating pressures made possible by the use of my invention also permit the use of diaphragm type air compressors which have very little friction in their working parts and add considerable to the over all efficiency of the apparatus. The use of a diaphragm type air compressor also eliminates possibility of the air picking up oil vapors. These oil vapors, if present, are liable to accumulate in the rectification column at the same place as the liquid oxygen and upon reaching a certain concentration, are liable to result in an explosion. Elimination of the explosion hazard makes the apparatus suitable for use on aircraft or in public buildings or places where safety precautions must be observed. It is merely necessary to energize the apparatus and the apparatus will deliver substantially pure oxygen after the same has run for a predetermined length of time. The apparatus is particularly useful for portable welding units, in aeroplanes designed to travel at a high altitude, and in hospitals and in like places where oxygen in not too great quantities is required for immediate consumption.

Changes in the specific form of my invention, as herein described, may be made within the scope of what is claimed without departing from the spirit of my invention.

Having described my invention, what I claim as new and desire to protect by Letters Patent is:

1. The method of fractionating a gas mixture such as air in a gas fractionating apparatus including an evaporator for oxygen, said method comprising compressing and cooling the air, introducing the compressed cooled air into the fractionating apparatus, separating the constituents of the air, cooling of the constituents by the evaporation of liquid oxygen within the evaporator, expanding with external work a separate portion of compressed cooled gas to produce refrigeration, utilizing said refrigeration for cooling the air introduced into the fractionating apparatus discharging the expanded air to the atmosphere and controlling the volume of air expanded by the level of the liquid oxygen in said evaporator.

2. The method of fractionating a gas mixture such as air in a rectifying column which comprises compressing the air, cooling the compressed air to the condensing point, liquefying a portion of the cooled air, separating the liquefied portion from the gaseous portion, introducing the gaseous portion into said rectifying column at the lower end thereof and directing the same upwardly through the column, producing in the column liquid nitrogen and directing the same downwardly through the column in counter flow with the gaseous portion of air, to produce an oxygen enriched liquid fraction at the lower end of the column, introducing the liquid portion of the air into the column at an intermediate point in the column and further fractionating said oxygen enriched liquid fraction.

3. The method of fractionating air by rectification in two stages, and by heat exchange in an evaporator condenser which comprises cooling and compressing the air to such a pressure that the nitrogen separated under that pressure in the first stage of rectification can be liquefied in heat-exchange with oxygen vaporizing in the evaporator condenser, separating the liquefied nitrogen into two parts of fixed volumetric ratio, utilizing one of said parts as a reflux liquid in the first stage of rectification to produce a liquid fraction rich in oxygen and utilizing the other of said parts at reduced pressure in the second stage of rectification as a reflux liquid to produce a liquid fraction of substantially pure oxygen and a gaseous fraction of substantially pure nitrogen.

4. The method of fractionating air by rectification in two stages, which comprises cooling and compressing the air, separating under pressure in the first stage of rectification two liquid fractions, one rich in oxygen and the other consisting of substantially pure nitrogen, introducing the nitrogen fraction at reduced pressure to the second stage of rectification as a reflux liquid, introducing the oxygen rich fraction at reduced pressure into the second stage of rectification to produce in said second stage a fraction of substantially pure oxygen, and dividing the liquid oxygen fraction into two proportionate parts, bringing each of said parts separately into heat exchange relation with the nitrogen of the first stage to produce vaporization of said parts and condensation of the nitrogen, withdrawing one of the vaporized parts of the oxygen from the apparatus and utilizing the second vaporized part for coaction with the reflux liquid in the second stage to produce a substantially pure nitrogen gas fraction and the liquid oxygen fraction in the second stage.

5. In a gas fractionating apparatus, means for producing a fractionated liquid from the gas to be fractionated, a receptacle therefor, a number of vertically extending conduits within the receptacle and leading therefrom, said conduits having longitudinally extending slits therein, said slits having definite relative widths to produce in said conduits substantially fixed volumetric relation of the flow therethrough and means for utilizing the separate liquid streams from each conduit in the fractionating of the gas.

6. In a gas fractionating apparatus for fractionating air, a compressor for compressing the air, heat exchange means for cooling the compressed air, rectifying means for producing an oxygen fraction from the cooled compressed air, an expansion engine, means for conducting a portion of the compressed cooled air through said expansion engine and into said heat exchange means, to further cool the incoming compressed air, and control means for controlling the output from said expansion engine in direct relation to the amount of said oxygen fraction available in said rectifying means.

7. In a gas fractionating apparatus for fractionating air, a compressor for compressing the air, heat exchange means for cooling the compressed air, rectifying means for producing a liquid oxygen fraction from the compressed air, a receptacle therefor, an expansion engine, means for conducting a portion of the compressed cooled air through said expansion engine and into said heat exchange means, to further cool the incoming compressed air, and control means dependent for operation upon the height of the liquid oxygen in said receptacle for controlling the output of said expansion engine.

8. In a gas fractionating apparatus for fractionating air, a first rectifier, a second rectifier, a condenser therebetween, means for directing cold air into said first rectifier, a receptacle for a liquid rich in oxygen at the lower end of said first rectifier, means for conducting such liquid to the second rectifier, a receptacle for liquid nitrogen at the upper end of said first rectifier, and communicating with said condenser, dividing means for dividing the liquid nitrogen and for directing a portion of the same into the upper end of said first rectifier and the remainder into the upper end of said second rectifier, a receptacle for liquid oxygen at the lower end of said second rectifier and dividing means for dividing the liquid oxygen into two portions and a conduit for directing a portion of the same into said condenser and the remainder thereof exteriorly of said rectifier.

9. In a gas fractionating apparatus for fractionating air, a first rectifier, a second rectifier, a condenser therebetween divided into a first section and a second section, the first section communicating with the second rectifier and the second section with the exterior, means for directing cold air into said first rectifier, a receptacle for a liquid rich in oxygen at the lower end of said first rectifier, means for conducting such liquid to the second rectifier, a receptacle for liquid nitrogen at the upper end of said first rectifier and communicating with said condenser, dividing means for dividing the liquid nitrogen and for directing a portion of the same into the upper end of said first rectifier and the remainder into the upper end of said second rectifier, a receptacle for liquid oxygen at the lower end of said second rectifier, and dividing means for dividing the liquid oxygen and for directing a portion of the same into the first section of said condenser and the remainder thereof into the second section of said condenser.

10. In a gas fractionating apparatus, a rectifier having a heat exchange chamber therein, a receptacle for a liquid fraction of the gas to be fractionated, two conduits leading from the receptacle, proportional dividing means for restricting the flow through both of said conduits to cause division of the liquid into two streams, one of said conduits discharging into said chamber.

11. In a gas fractionating apparatus, a rectifier having a heat exchange chamber therein, a receptacle for a liquid fraction of the gas to be fractionated, two vertically extending conduits within the receptacle and leading therefrom, said conduits having longitudinally extending slits therein of predetermined form to cause division of the liquid, one of said conduits discharging into said chamber.

12. In an air fractionating apparatus producing liquid air, two rectifiers, means for directing the liquid air into one of said rectifiers, an evaporator condenser associated with said rectifiers, said evaporator condenser serving to produce a liquid rich in nitrogen, a receptacle for said liquid, means for dividing the liquid in said receptacle into separate portions of substantially fixed volumetric ratio, means for directing one of said portions into the other rectifier for heat exchange therein to produce a liquid rich in oxygen, means for directing the other portion of said second named liquid into said first named rectifier for heat exchange with the air therein to produce a nitrogen gas for circulation through said evaporator condenser, means for dividing the third named liquid into separate portions of substantially fixed volumetric ratio and means for directing one of said portions of said third named liquid into said evaporator condenser for heat exchange to cause vaporization of the liquid rich in oxygen and the production of oxygen gas and liquifaction of the nitrogen gas entering said evaporator condenser from said first named rectifier.

13. In an air fractionating apparatus continuously producing liquid air, two rectifiers, means for directing the liquid air into one of said rectifiers, an evaporator condenser associated with said rectifiers, said evaporator condenser serving to produce a liquid rich in nitrogen, dividing means for dividing the liquid as formed into two streams having substantially fixed volumetric ratio, means for directing one of said streams into the other rectifier, said other rectifier continuously producing a liquid rich in oxygen, means for directing the other portion of said second named liquid into said first named rectifier for heat exchange with the air therein to produce nitrogen gas for circulation through said evaporator condenser, means for dividing the third named liquid as formed into two streams having substantially fixed volumetric ratio and means for directing one of said streams of said third named liquid into said evaporator condenser for heat exchange to cause vaporization of the oxygen therein and liquifaction of the nitrogen gas entering said evaporator condenser from said first named rectifier.

14. In an air fractionating apparatus, continuously producing liquid air, two rectifiers, means for directing the liquid air into one of said rectifiers, an evaporator condenser associated with said rectifiers, said evaporator condenser serving to produce a liquid rich in nitrogen, a receptacle therefor, two vertically extending conduits within the receptacle and leading therefrom, said conduits having longitudinally extending slits therein, said slits being formed to produce a substantially fixed volumetric ratio of flow into the conduits, means for directing the liquid from one of said conduits to the other rectifier, means for directing the other portion of said second named liquid into said first named rectifier for heat exchange with the air therein to produce nitrogen gas for circulation through said evaporator condenser, said other rectifier continuously producing a liquid rich in oxygen, a receptacle therefor, two vertically extending conduits within said receptacle and leading therefrom, said conduits having longitudinally extending slits therein, said slits being formed to produce a substantially fixed volumetric ratio of flow into said conduits, one of said conduits discharging into said evaporator condenser for heat exchange to cause vaporization of the oxygen therein and liquifaction of the nitrogen gas entering said evaporator condenser from said first named rectifier.

RICHARD T. CORNELIUS.

REFERENCES CITED

The following references are of record in the file of this patent:

UNITED STATES PATENTS

| Number | Name | Date |
|---|---|---|
| 1,093,859 | Johnson | Apr. 21, 1914 |
| 1,539,450 | Wilkenson | May 26, 1925 |
| 1,607,321 | Van Nuys | Nov. 16, 1926 |
| 1,785,491 | Messer | Dec. 16, 1930 |
| 1,842,263 | Gobert | Jan. 19, 1932 |
| 1,853,236 | Shadle | Apr. 12, 1932 |
| 1,956,495 | DeBaufre | Apr. 24, 1934 |
| 1,970,299 | Frankl | Aug. 14, 1934 |
| 2,062,781 | DeBaufre | Dec. 1, 1936 |
| 2,089,558 | Karwat | Aug. 10, 1937 |
| 2,116,191 | DeBaufre | May 3, 1938 |
| 2,217,467 | Bonnaud | Oct. 8, 1940 |
| 2,240,925 | DeBaufre | May 6, 1941 |
| 2,252,739 | Stoever | Aug. 19, 1941 |
| 2,256,421 | Borchardt | Sept. 16, 1941 |
| 2,321,445 | Yendall et al. | June 8, 1943 |
| 2,327,459 | Rice | Aug. 24, 1943 |
| 2,446,535 | Fausek et al. | Aug. 10, 1948 |

FOREIGN PATENTS

| Number | Country | Date |
|---|---|---|
| 469,943 | Great Britain | Aug. 3, 1937 |

OTHER REFERENCES

Ruhemann, "The Separation of Gases," 1940; The Clarendon Press; Oxford, England.